US010819782B2

(12) United States Patent
Hoffman et al.

(10) Patent No.: US 10,819,782 B2
(45) Date of Patent: *Oct. 27, 2020

(54) PERSONAL DIGITAL SERVER (PDS)

(71) Applicant: Woodstock Systems, LLC, Woodstock, NY (US)

(72) Inventors: James Hoffman, Woodstock, NY (US); James Friskel, Rockledge, FL (US)

(73) Assignee: WOODSTOCK SYSTEMS, LLC, Woodstock, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/586,132

(22) Filed: Sep. 27, 2019

(65) Prior Publication Data
US 2020/0028903 A1 Jan. 23, 2020

Related U.S. Application Data

(60) Continuation of application No. 15/607,304, filed on May 26, 2017, now Pat. No. 10,484,469, which is a
(Continued)

(51) Int. Cl.
*H04L 29/08* (2006.01)
*G06F 21/62* (2013.01)
*H04L 29/06* (2006.01)

(52) U.S. Cl.
CPC ...... *H04L 67/1091* (2013.01); *G06F 21/6218* (2013.01); *H04L 63/0428* (2013.01); *H04L 63/08* (2013.01); *H04L 63/101* (2013.01); *H04L 63/104* (2013.01); *H04L 67/104* (2013.01); *H04L 67/1068* (2013.01); *H04L 67/16* (2013.01); *H04L 67/2823* (2013.01); *H04L 67/42* (2013.01); *H04L 67/1093* (2013.01); *H04L 2463/101* (2013.01); *Y10S 705/908* (2013.01)

(58) Field of Classification Search
CPC . H04L 67/1091; H04L 63/0428; H04L 63/08; H04L 63/101; H04L 63/104; H04L 67/1068; H04L 67/16; H04L 67/2823; H04L 67/42; G06F 21/6218
See application file for complete search history.

(56) References Cited

U.S. PATENT DOCUMENTS 5,583,561 A 12/1996 Baker et al.
5,588,061 A 12/1996 Ganesan et al.
(Continued)

FOREIGN PATENT DOCUMENTS

WO WO 01/86392 11/2001

OTHER PUBLICATIONS

International Search Report from PCT/US02/41403, dated Apr. 25, 2003.

*Primary Examiner* — Shanto Abedin
(74) *Attorney, Agent, or Firm* — Louis J. Hoffman

(57) ABSTRACT

Personal Digital Server ("PDS") is a unique computer application for the storage, updating, management and sharing of all types of digital media files, including audio, video, images and documents, irrespective of their format. PDS provides users with a single location to store and access, both locally and remotely, all of their digital media. It also provides the user total control of the overall management of these assets.

18 Claims, 7 Drawing Sheets

Related U.S. Application Data division of application No. 14/512,982, filed on Oct. 13, 2014, now Pat. No. 9,667,717, which is a division of application No. 12/709,933, filed on Feb. 22, 2010, now Pat. No. 8,862,894, which is a division of application No. 10/499,793, filed as application No. PCT/US02/41403 on Dec. 24, 2002, now abandoned.

(60) Provisional application No. 60/344,066, filed on Dec. 28, 2001.

(56) References Cited

U.S. PATENT DOCUMENTS

| | | | |
|---|---|---|---|
| 5,748,735 | A | 5/1998 | Ganesan |
| 5,765,152 | A | 6/1998 | Erickson |
| 6,041,357 | A | 3/2000 | Kunzelman et al. |
| 6,055,637 | A | 4/2000 | Hudson et al. |
| 6,247,130 | B1 | 6/2001 | Fritsch |
| 6,330,572 | B1 | 12/2001 | Sitka |
| 6,477,644 | B1 | 11/2002 | Turunen |
| 6,640,097 | B2 | 10/2003 | Corrigan et al. |
| 6,718,328 | B1 | 4/2004 | Norris |
| 6,742,028 | B1 | 5/2004 | Wang et al. |
| 6,898,636 | B1 | 5/2005 | Adams et al. |
| 6,976,093 | B2 | 12/2005 | Lara et al. |
| 7,028,033 | B2 | 4/2006 | Brighl et al. |
| 7,039,806 | B1 | 5/2006 | Friedman et al. |
| 7,046,269 | B2 | 5/2006 | Parker et al. |
| 7,058,720 | B1 | 6/2006 | Majidimehr |
| 7,216,156 | B2 | 5/2007 | Chatani |
| 7,401,235 | B2 | 7/2008 | Mowers et al. |
| 7,426,574 | B2 | 9/2008 | Liao |
| 7,440,953 | B2 | 10/2008 | Sidman |
| 7,475,246 | B1 * | 1/2009 | Moskowitz ............... G06F 21/10 713/169 |
| 7,720,996 | B2 | 5/2010 | Soles et al. |
| 7,721,110 | B2 * | 5/2010 | Kouznetsov ......... H04L 67/104 713/187 |
| 7,721,339 | B2 | 5/2010 | Madison et al. |
| 2002/0013763 | A1 | 1/2002 | Harris |
| 2002/0046232 | A1 * | 4/2002 | Adams ................ G06F 16/1834 709/200 |
| 2002/0062310 | A1 | 5/2002 | Marmor et al. |
| 2002/0062336 | A1 | 5/2002 | Teodosiu et al. |
| 2002/0078361 | A1 | 6/2002 | Giroux et al. |
| 2002/0087887 | A1 | 7/2002 | Busam et al. |
| 2002/0091792 | A1 | 7/2002 | Janniello et al. |
| 2002/0107968 | A1 | 8/2002 | Horn et al. |
| 2002/0107982 | A1 | 8/2002 | Teodosiu et al. |
| 2002/0120577 | A1 | 8/2002 | Hans et al. |
| 2002/0120607 | A1 | 8/2002 | Price et al. |
| 2002/0138471 | A1 | 9/2002 | Dutta et al. |
| 2002/0143791 | A1 | 10/2002 | Levanon et al. |
| 2002/0152214 | A1 | 10/2002 | Muntz |
| 2002/0157002 | A1 | 10/2002 | Messerges et al. |
| 2002/0178261 | A1 | 11/2002 | Chang et al. |
| 2002/0184158 | A1 | 12/2002 | Tadayon et al. |
| 2003/0004885 | A1 | 1/2003 | Banerjee et al. |
| 2003/0009518 | A1 * | 1/2003 | Harrow ................... H04L 47/10 709/203 |
| 2003/0014630 | A1 | 1/2003 | Spencer et al. |
| 2003/0014759 | A1 | 1/2003 | Van Stam |
| 2003/0028610 | A1 * | 2/2003 | Pearson .............. H04L 61/2564 709/213 |
| 2003/0041093 | A1 | 2/2003 | Yamane et al. |
| 2003/0051156 | A1 | 3/2003 | Razdan et al. |
| 2003/0093401 | A1 | 5/2003 | Czajkowski et al. |
| 2003/0115283 | A1 | 6/2003 | Barbir et al. |
| 2003/0126211 | A1 | 7/2003 | Anttila et al. |
| 2003/0149601 | A1 | 8/2003 | Cabral |
| 2003/0163702 | A1 | 8/2003 | Vigue et al. |
| 2003/0196107 | A1 | 10/2003 | Robertson et al. |
| 2003/0217163 | A1 | 11/2003 | Lagerweij et al. |
| 2003/0236820 | A1 | 12/2003 | Tierney et al. |
| 2004/0093273 | A1 | 5/2004 | Laurent et al. |
| 2004/0148523 | A1 | 7/2004 | Lambert |
| 2004/0255048 | A1 | 12/2004 | Lev Ran et al. |
| 2006/0150257 | A1 | 7/2006 | Leung et al. |

* cited by examiner

PERSONAL DIGITAL SERVER (PDS)

CROSS-REFERENCE TO RELATED APPLICATIONS

This application is a continuation of application Ser. No. 15/607,304, filed May 26, 2017, which is a division of application Ser. No. 14/512,982, filed Oct. 13, 2014, now U.S. Pat. No. 9,667,717, which is a division of application Ser. No. 12/709,933, filed Feb. 22, 2010, now U.S. Pat. No. 8,862,894, which is a division of application Ser. No. 10/499,793, filed Nov. 15, 2004, which is a National Stage Entry of PCT/US2002/041403, filed Dec. 24, 2002, which claims priority to provisional application Ser. No. 60/344,066, filed Dec. 28, 2001, the disclosures of which [Fish] are hereby incorporated by reference.

FIELD OF THE INVENTION

The present invention relates to telecommunications, and in particular to management, distribution and sharing of digital media files.

BACKGROUND INFORMATION

With the advances of computer information systems, individuals and businesses around the world have collected a wide variety of content on their computers, including music files, digital photographs and various types of documents including word processing documents and spreadsheets. One of the primary needs of computer users is the ability to share such content with other users because of affinity, friendship, and business relationships. Although there are other computer systems that allow sharing of content, there does not currently exist a comprehensive system to manage a wide variety of content from initial organization through sharing. Moreover, none of the existing systems ensure satisfactory digital rights management and are thus increasingly prone to legal challenges.

SUMMARY OF THE INVENTION

The present invention is a unique computer application ("PDS") for the storage, updating, management and sharing of all types of digital media files, including audio, video, images and documents, irrespective of their format. PDS provides users with a single location to store and access all of their digital media. It also provides the user total control of the overall management of these assets. This level of user control is unparalleled in the marketplace today.

PDS enables a content owner (an "Owner") to share his or her digital media catalog with a limited group (a "Peer Group") of permitted users ("Peers") over a peer-to-peer network that requires only limited interaction with a central server. The sharing of Owner's audio and video files is limited to streaming them to one Peer (or another pre-set limited number of Peers) at a time and, optionally, without an opportunity for the Peer to download, permanently store or make copies of the files, and is thus copyright-friendly. PDS makes digital content accessible from any Internet-enabled electronic device, e.g., desktop and portable computers, PDA and web-enabled cellular telephones. PDS allows each Owner to monitor and control the use of his or her digital catalog, including the ability to see which Peers are accessing particular files and to cancel their access at any time. The system also allows an Owner to expose or grant access to files on Owner's computer without having to move files to a special place and without exposing any of the characteristics of the folder or directory structure of Owner's computer. This access method is keyed to the visitor's email address and enables secure trusted communications without exposing passwords or requiring a complex setup.

PDS users will also benefit from a proprietary User Interface designed specifically for the new ways in which personal digital media can be managed via the storage server. In addition to its core technology, PDS may include the following "add-on" features:

Music: organizer, playback (by multiple simultaneous users via any Internet enabled device), play lists, detailed artist/album information, recommendations, downloads, purchase, CD creation & management of portable MP3 players.

Photos: organizer, storage for thousands of photos, display with zoom, printing (to low-cost photo quality printers), auto-upload from digital cameras.

Internet Radio: organizer, access to thousands of stations, time based recording and playback, download to portable players.

Home Video: organizer, storage of home videos, playback (by multiple simultaneous user via any Internet enabled device).

Books: organizer, storage for hundreds of audio or eBooks, playback (by multiple simultaneous users via any Internet enabled device), download to portable players.

Document Library: organizer, storage for thousands of files, upload, download, auto PC backup.

Third-Party Delivery: music downloads, photo processing, documents.

PDS' core technology utilizes several components that can be categorized as follows: (1) authentication and authorization of Peers, (2) "real-time" detection and sorting of a Peer's digital files, (3) indexing of digital files and exchange of such indices among the Peer Group, (4) searching for auxiliary content, (5) remote access to digital content, (6) restricting access to copyrighted media, (7) intelligent bandwidth management and (8) information system and architecture for a peer-to-peer network. Each of these components is detailed below.

DETAILED DESCRIPTION OF THE INVENTION

1. Authentication and Authorization of Users. (a) Simplicity Using E-mail Addresses to Verify User Authorization.

PDS includes a very simple e-mail address based system for an Owner to authorize others to access Owner's media. To provide access to a given user (a "Guest"), the Owner simply enters the Guest's email address. PDS then sends an e-mail "Invitation" to the Guest. If the Guest has never registered with the PDS central server, the Guest is directed to set up a PDS master account on the PDS central server by submitting a valid e-mail address and a password of their own creation. This registration only needs to occur once, and the Guest is then enabled, though not authorized, to access any PDS-networked/enabled device.

(b) Security—Using GUID at the Peer-to-Peer Level.

Figure 1:
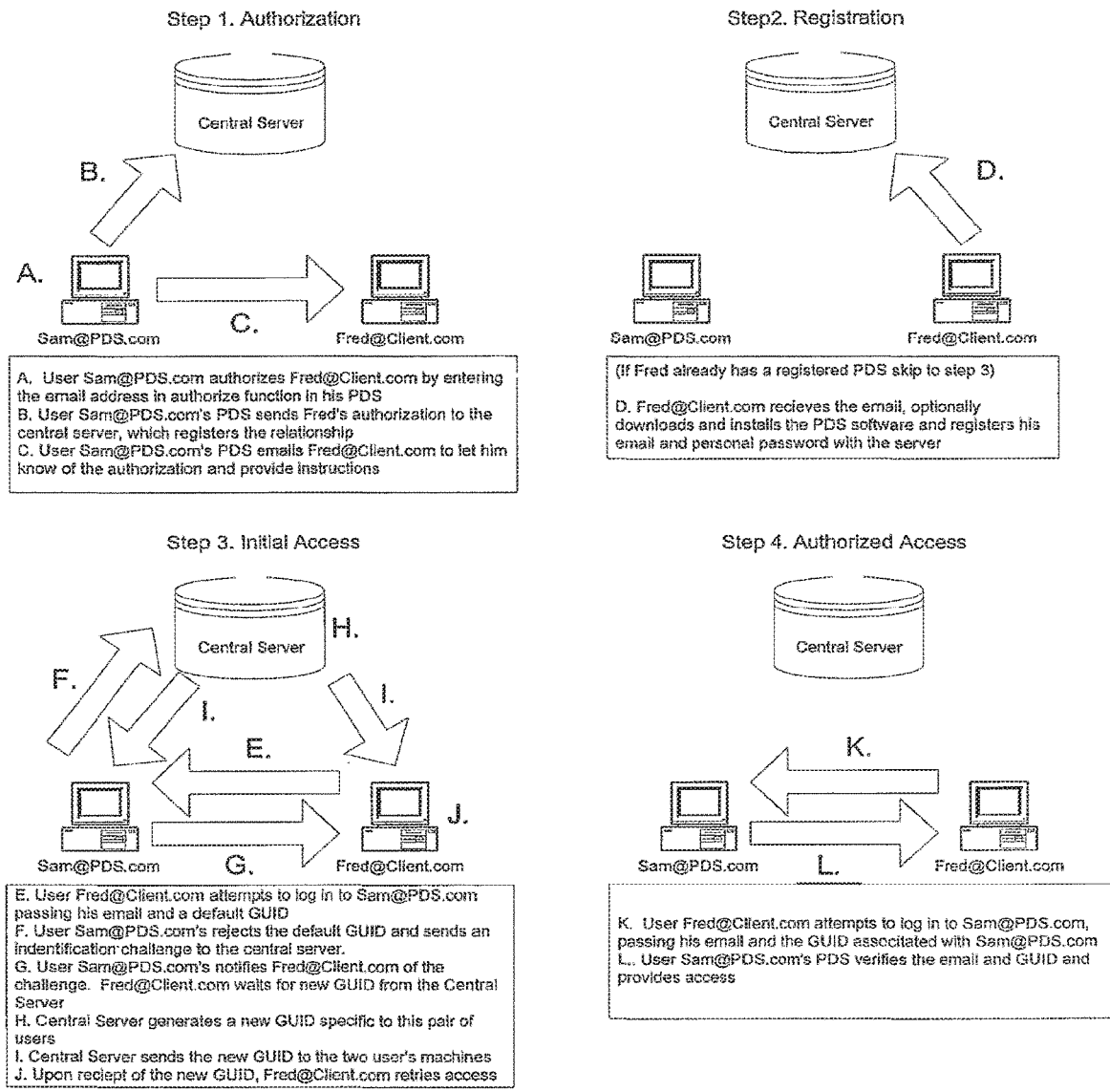
FIG. 1 is a flow diagram of the authentication and authorization processes.

When the Guest tries to access the Owner's PDS to which the Guest had been invited, the Owner's PDS requests a global unique identifier ("GUID") that applies only to transactions between this particular pair of users (i.e., the Owner and the Guest). This GUID is used in place of the Guest's password, so that the Owner's PDS never needs to see or store the Guest's password. If the Owner's PDS is not supplied with the correct GUID from the Guest, it issues a challenge and requests that the PDS central server authenticate the Guest. This initiates a process illustrated in FIG. 1, whereby the PDS central server authenticates the Guest and generates a new "GUID" which is then supplied to both the Owner's PDS and the Guest. The Guest is now authorized to access the Owner's PDS. Thus, for example, if a user (the "Requesting User") wishes to listen to a song stored by a Peer (the "Providing User"), the Requesting User's computer (or another access device) needs to transmit the correct e-mail addresses and the corresponding GUID. This method avoids sharing passwords among users of the system, thus providing privacy to the Requesting User and also eliminating the occurrence of "cascading" breaches (where an intruder who breaks into the hard drive of one user can steal the passwords of all of such user's Peers and therefore defeat the security on each successive degree of separation). The GUID-based authentication system (as opposed to password-exchange alternatives) also helps prevent a Requesting User from caching or downloading streamed audio and video files, thereby making PDS copyright-friendly. It additionally allows a Guest to create his or her own password that works across an unlimited number of unconnected devices without ever passing the Guest's password to those devices.

(c) Fault Tolerance and Scale—Limited Need for a Central Server.

GUID-based authentication substantially reduces the burden on the PDS central server. The central server needs to be involved only the first time the Requesting User's access device contacts the Providing User. All subsequent communications or transactions can occur on a direct Peer-to-Peer basis by using the GUID. This vastly improves the fault tolerance and scalability of the PDS network, as new users and devices can be added without exerting significant additional strain on the central server.

2. File Detection.

After installing the software, the PDS file detection algorithm scans all of the user's drives and directories with the exception of system and temporary directories, detects and identifies media files and organizes them by type, regardless of the application that created, updated or stored them. This operation takes several minutes, as opposed to the half-hour or more required by the existing algorithms. The reason it is quicker is that it initially identifies metadata by parsing the filename, instead of reading the imbedded tags within the MP3, WMA and associated files. Filenames can be parsed effectively, because many storage applications utilize standardized nomenclature. For example, the names of audio files typically include the artist, album and track titles, and the file type. Existing file detection algorithms look at the filename to detect the file type, but identify the media content itself by searching for imbedded tags within the file. PDS, on the other hand, looks at the filename to detect both the file type and identify the media content. Only if the filename does not contain the metadata, PDS would look for imbedded Tags within the file.

While a user's PDS is running, the algorithm intermittently scans the hard drive whenever the user's computer is idle, i.e., is not performing other, memory consuming functions. During the initial data collection, the algorithm compiles a table of directories where it finds media files. At each subsequent scan, the algorithm looks at these directories first, and when a file changes in a directory, that directory is automatically rescanned, and the listing of its contents is updated. This "background" scanning is incremental, i.e., it only detects files that have been added to the user's computer since the previous scan, and therefore takes mere seconds. Another distinguishing feature of this algorithm is that it searches locations where new files might be stored in the decreasing order of likelihood: it first looks at the most logical place other applications store media files, then proceeds to look in the least likely places. This methodology conserves search time and the operating memory of the user's computer.

3. Index Updates and Exchange; Content Distribution.

Figure 2:
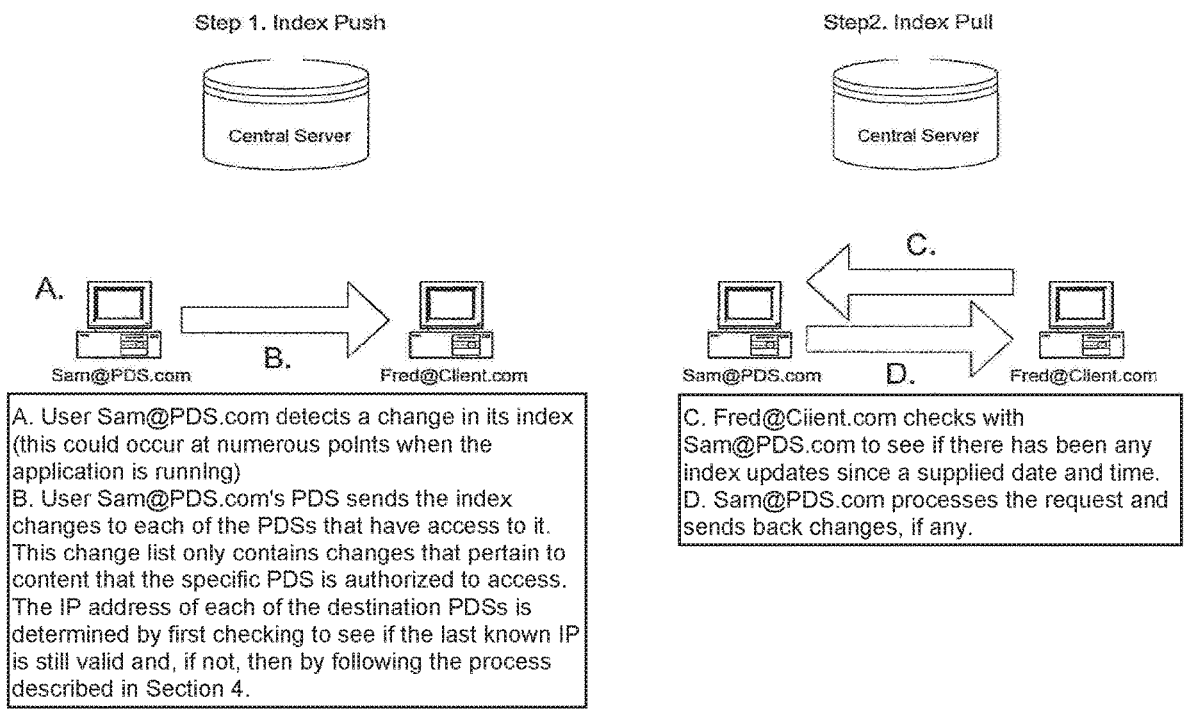
FIG. 2 is a flow diagram of the index update and exchange processes.

After PDS scans a user's hard drive for digital media content, it organizes the new content by file type and creates or updates an index of the content. The user's PDS then sends a copy of the updated index to each of its other Peer Group members, utilizing the GUID authentication algorithm described in paragraph 1 above. This operation is performed intermittently and upon detection of new content, throughout the period of time the user is logged on the PDS network. The advantage of such index exchange is that Peers are not required to search the entirety of each other's hard drives to find a particular file—instead, they search each other's indices which are continuously updated. This again conserves time and operating memory. Importantly, neither the users' digital media content nor their indices are copied onto the central server, which makes the network much more scalable and less prone to be overloaded and malfunction. The updates are user specific, so that the Peers only receive indexes that list content that they are authorized to access. Additionally, the distributed indexes allow users to review the index of content stored even on those devices which are not turned on. FIG. 2 illustrates an index update and exchange algorithm according to the present invention.

Figure 3:
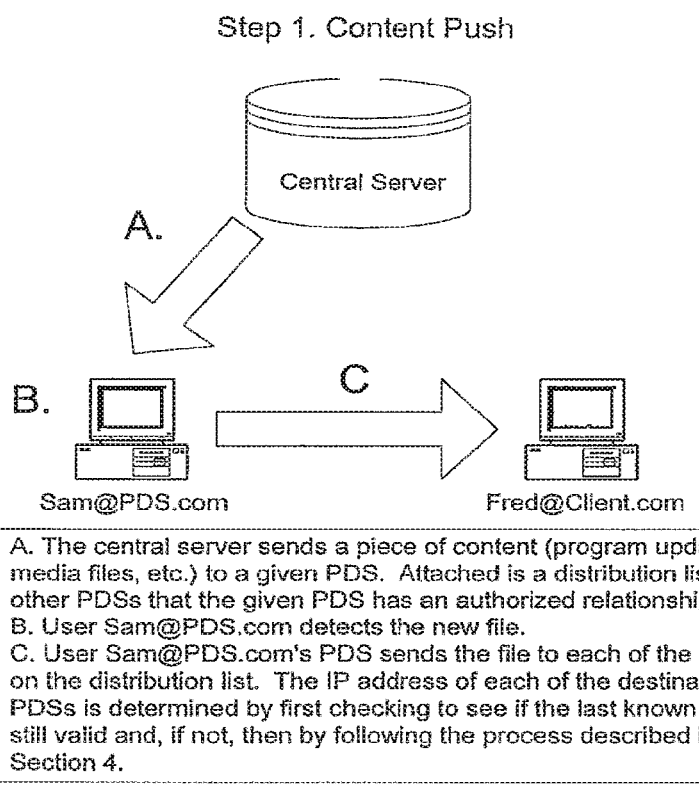
FIG. 3 is a flow diagram of the global content distribution process.

The technology involved in index exchange also enables (but does not require) distribution of content from the PDS central server. Thus, it is very easy and convenient to send software upgrades, promotional messages and media files to the users of the network. FIG. 3 illustrates a variation of the index-exchange algorithm that enables such network-wide content distribution.

Step 1. Index Push

A. User Sam@PDS.com detects a change in its index (this could occur at numerous points when the application is running).

B. User Sam@PDS.com's PDS sends the index changes to each of the PDSs that have access to it. This change list only contains changes that pertain to content that he specific PDS is authorize to access. The IP address of each of the destination PDSs is determined by first checking to see if the last known PDS is still valid and, if not, then by following the process described in Section 4.

Step 2. Index Pull

C. Fred@Client.com checks with Sam@PDS.com to see if there has been any index updates since a supplied date and time.

D. Sam@PDS.com processes the request and sends back changes, if any.

4. Searching for Auxiliary Content.

Figure 4:
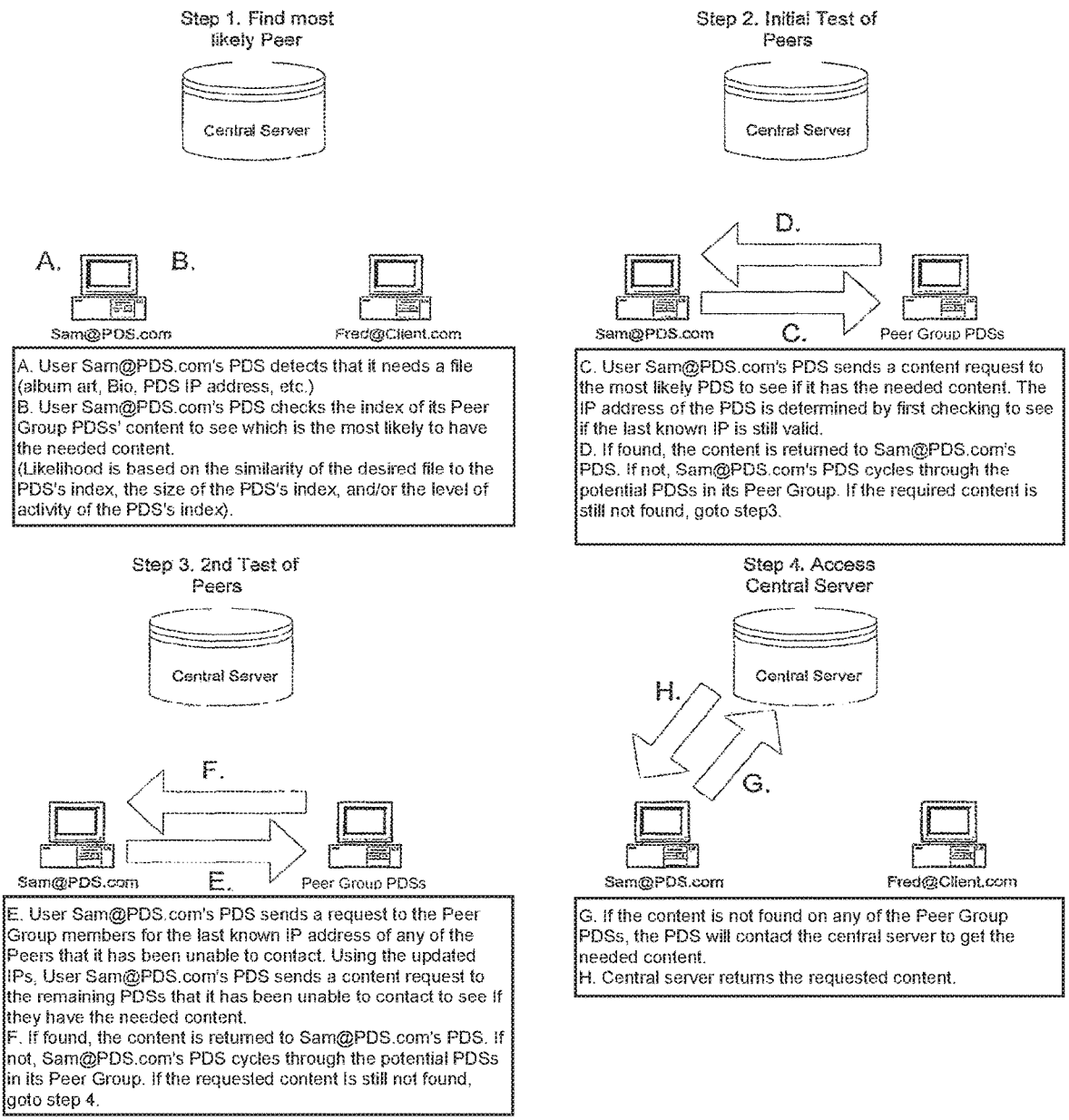
FIG. 4 is a flow diagram of the search algorithm.

The central server may contain certain information of general interest about particular media files stored on a user's hard drive, for example, a database of music titles, cover art and artists' biographies. A user requesting a particular title from a Peer might want to access and download such information. The PDS content search algorithm is unique in that it will begin searching for the requested information at the less likely source, i.e., on the Peers' hard drives, and will turn to the most likely source the central server only if none of the active Peers have the information. This method significantly reduces search time and the overloading of the central server. This new method of programming—moving from less reliable sources of information to the most reliable source—can be applied in many applications where network-wide speed and conservation of resources is more important than immediate reliability. FIG. 4 illustrates an algorithm for this search function:

Step 1. Find most likely Peer

A. User Sam@PDS.com's PDS detects that it needs a file (album art, Bio, PDS IP address, etc.).

B. User Sam@PDS.com's PDS checks the index of its Peer Group PDSs' content to see which is the most likely to have the needed content. Likelihood is based on the similarity of the desired file to the PDS's index, the size of the PDS's index and/or the level of activity of the PDS's index.

Step 2. Initial Test of Peers

C. User Sam@PDS.com's PDS sends a content request to the most likely PDS to see if it has the needed content. The IP address of the PDS is determined by first checking to see if the last known IP is still valid.

D. If found, the content is returned to Sam@PDS.com's PDS. If not, Sam@PDS.com's PDS cycles through the potential PDSs in its Peer Group. If the required content is still not found, goto step 3.

Step 3. 2nd Test of Peers

E. User Sam@PDS.com's PDS sends a request to the Peer Group members for the last known IP address of any of the Peers that it has been unable to contact. Using the updated IPs, user Sam@PDS.com's PDS sends a content request to the remaining PDSs that it has been unable to contact to see if they have the needed content.

F. If found, the content is returned to Sam@PDS.com's PDS. If not, Sam@PDS.com's PDS cycles through the potential PDSs in its Peer Group. If the requested content is still not found, goto step 4.

Step 4. Access Central Server

G. If the content is not found on any of the Peer Group PDSs, the PDS will contact the central server to get the needed content.

H. Central server returns the requested content.

Remote File Access.

There are currently two general types of remote-access applications that allow users' to access their own (and each other's) files across various Internet-enabled devices, neither of which matches the remote-access capabilities of PDS. The first type includes applications which depend on replicating the home computer's graphical desktop environment on the remote-access device. This method does not work well for access devices which either are not built for a graphical desktop environment or use a smaller screen resolution, such as PDA and cell phones. It also requires a high-speed Internet connection and does not work well in a multi-user setting, due to its limited ability to control access at the file level. The second type of remote-access applications, such as access based on the FTP protocol or facilitated by a web-server, depends on the ability of the remote device to browse the home computer's file directories. It is prohibitively complex to integrate the functions of authorization of users and files into applications of this type. It also poses issues in that the users must know what the content is named and where the content is located on the host. Instead, PDS' remote access feature utilizes a method of publishing a view of the content (formatted in XML if relevant to include) that is user specific (only the content that specific user is authorized to see) and able to include enhanced meta data (logically organized and containing descriptions/labels more meaningful than simply file names). This view is able to be easily formatted to any device as it requires neither the replication of the desktop environment, nor the browsing of file directories. This enables PDS users to access and or share their own media files (e.g., listen to music and view videos) remotely in a contextually relevant, simple and reliable manner regardless of the type of access device.

6. Restricted File Access.

PDS ensures copyright-friendly music and video file sharing by (a) preventing the recipient of streamed audio and video files from saving, copying, caching or downloading them and (b) blocking others from accessing the file while it is being streamed. This approach electronically replicates the lending of copyrighted works in the physical world of books, tapes and CDs. There currently does not exist a system for peer-to-peer sharing of digital media, which limits the sharing of media to a one-on-one experience, such that, for example, a single song from a CD is played to only one person (or another pre-set number of simultaneous users) at any one time. PDS creates a vehicle for the sharing of music (and/or video) with reasonable limitations on the User, whereby music is not spread unintentionally or intentionally beyond the single play of one song for one user (or another pre-set number of simultaneous users) at a time. The PDS system further limits the sharing of music (and/or video) to closely-related users, such as friends or business associates.

Other systems that are capable of preventing access to a content stream do so by authorizing access to particular groups of content, with the number of simultaneous users limited only by the resources of the system's central server, not by software design as in the case of PDS. Additionally, these other systems do not block access to the underlying media file itself; the file may thus be used by several applications at the same time, creating a possibility of copyright infringement. PDS is more protective of copyright owners in that it blocks the streamed file from being accessed by any other user or application. The PDS approach also allows for treating different types of media files differently, i.e., access need not be restricted for personal photographs and documents, where copyright infringement is unlikely. In addition, each Owner can customize levels of access to such Owner's digital catalog using several parameters, e.g., identity of a Peer, file type and individual file name. The Owner can also limit the length of time a Peer can access a file, as well as specify the type of access the Peer is granted, e.g. playing, viewing or borrowing. The Owner can terminate or change the level of a Peer's access at any time. Finally, the system can be used for streaming real-time content, as well as sharing downloaded content utilizing. Digital Rights Management techniques. Below is the technical description of the PDS file-access restriction method:

File "borrowing" can be implemented by streaming or by having the Requesting User make a copy of the file. Streaming has the advantage of allowing the Requesting User to immediately render the file via the stream. Streaming requires that the Requesting User have an Internet connection to the Owner's PDS device for the duration of the streaming. Copying, on the other hand, has the advantage of allowing the Requesting User to render the file at a later time without being connected to the Owner's PDS device. The examples below outline the methods of streaming and copying by one peer at a time; however, the PDS software is configurable to limit the streaming and copying to two or any other number of Peers at a time.

A. Method for Peer-to-Peer File "Borrowing" via Streaming:

1. The PDS software running on a Requesting User's access device maintains an index of all media files. The index also contains metadata for each media file, including information about who currently has borrowed the file, when they borrowed the file, and for how long they borrowed the file.

2. When the Requesting User attempts to stream a media file, the system first determines (by reading the metadata about the file from the index) if the file is already "borrowed" by another Peer. If so, it rejects the request. Otherwise, it will update the metadata for the file in the index, lock the file from use by other applications and allow the Requesting User access to the stream.

3. The stream is encrypted in a way which will only allow it be "rendered" by the Requesting User while being streamed from the Owner's PDS device. This prohibits the Requesting User from making a "copy" of the stream for later playback or viewing.

B. Method for Peer-to-Peer File "Borrowing" via Copying the File:

1. The PDS software running on a Requesting User's access device maintains an index of all media files. The index also contains metadata for each media file including information about who currently has borrowed the file, when they borrowed the file, and fbr how long they borrowed the file.

2. When the Requesting User attempts to copy a media file, the system first determines (by reading the metadata about the file from the index) if the file is already "borrowed" by another Peer. If so, it rejects the request. Otherwise, it will update the metadata for the file in the index to reflect that the Requesting User has borrowed the file and lock the file from use by other applications.

3. The system encrypts the file, adding encrypted metadata to the beginning of the file marking who the Owner is, who the Requesting User is, and when the "borrowing" will expire. A copy of the encrypted file is then transferred to the Requesting User's machine.

4. The software will restrict the Owner of the file from rendering the file in any way until the expiration date and time of the "borrowing" has been reached.

5. The software will allow the Requesting User to render the file up until the time the expiration has been reached.

Figure 5:
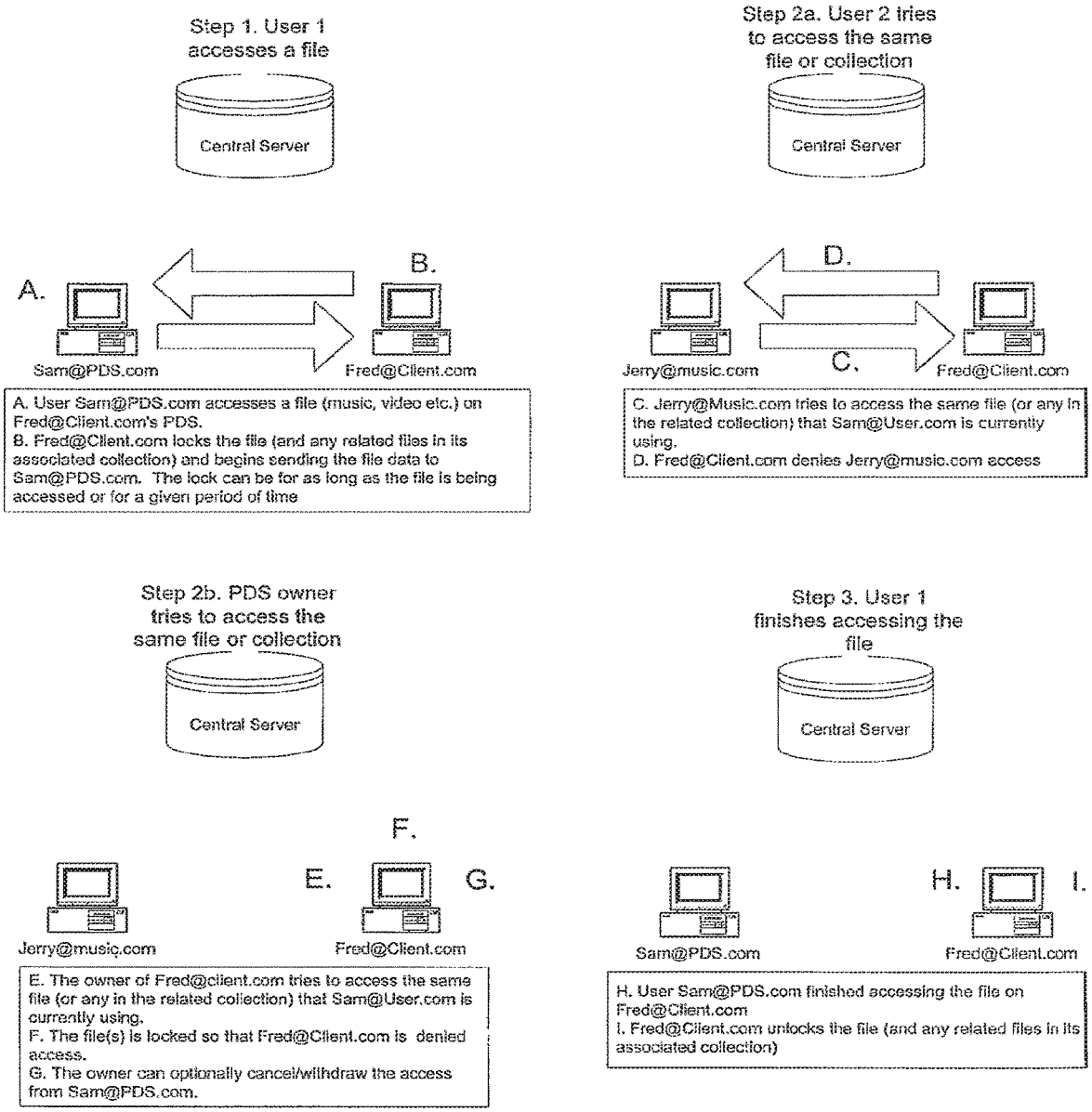
FIG. 5 is a flow diagram of the file lending process.

FIG. 5 illustrates an exemplary flow of events among three peers, showing restricted access to media files according the present invention.

7. Bandwidth Management.

Figure 6:
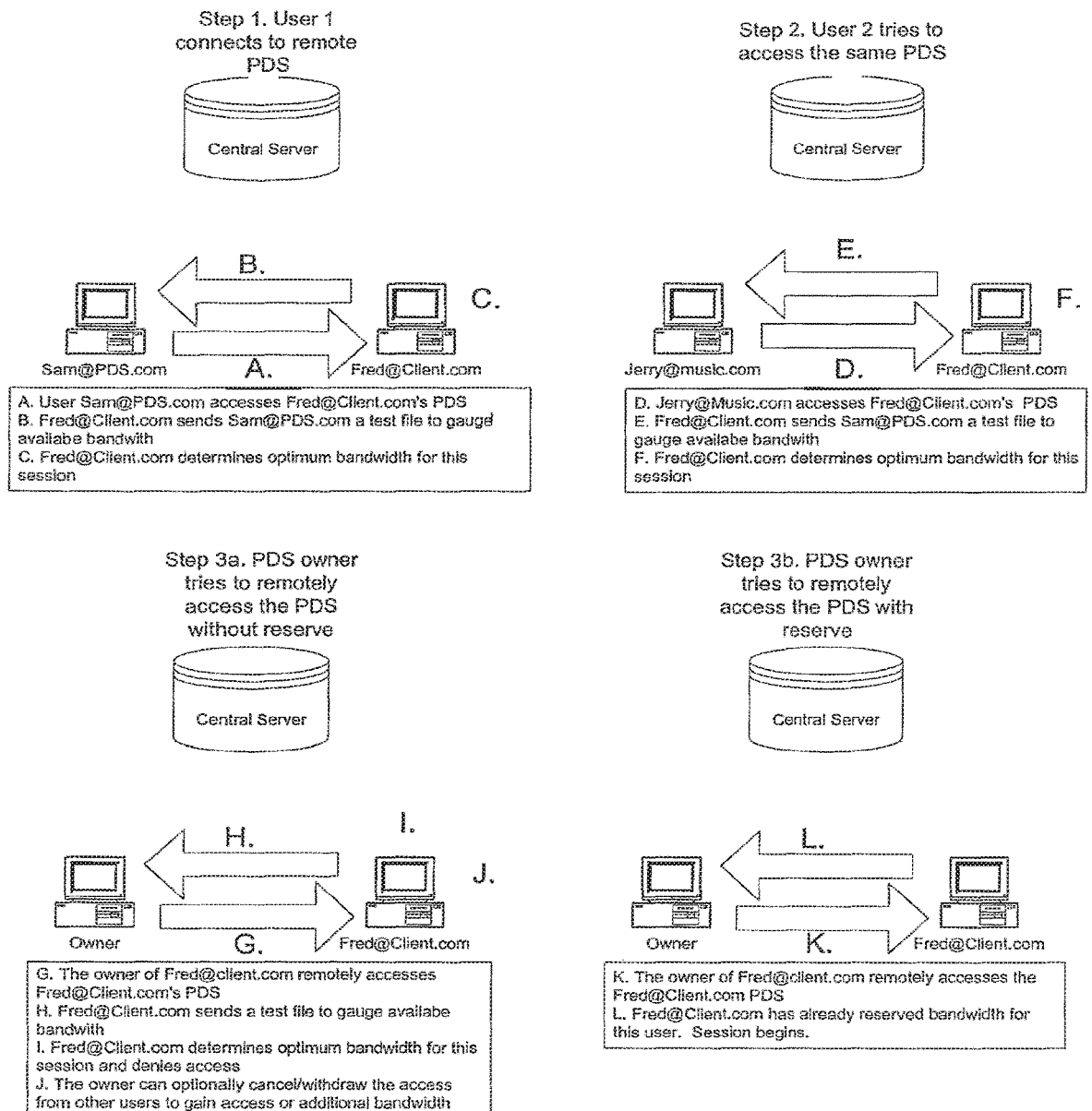
FIG. 6 is a flow diagram of the bandwidth allocation algorithm.

PDS utilizes a novel approach to bandwidth management by monitoring and streaming from a Providing User's PDS device and restricting access when that device is at or near the peak of its overall bandwidth capacity. This provides a better user experience, reduces the delay in file access and facilitates more even allocation of Peer Group resources. The system also allows for reserving a "guaranteed" amount of bandwidth (and thus a "guaranteed" level of access) for certain users or groups of users. FIG. 6 illustrates a bandwidth management algorithm according to the present invention.

8. An Information System and Architecture for a Peer-to-Peer Network.

Figure 7:
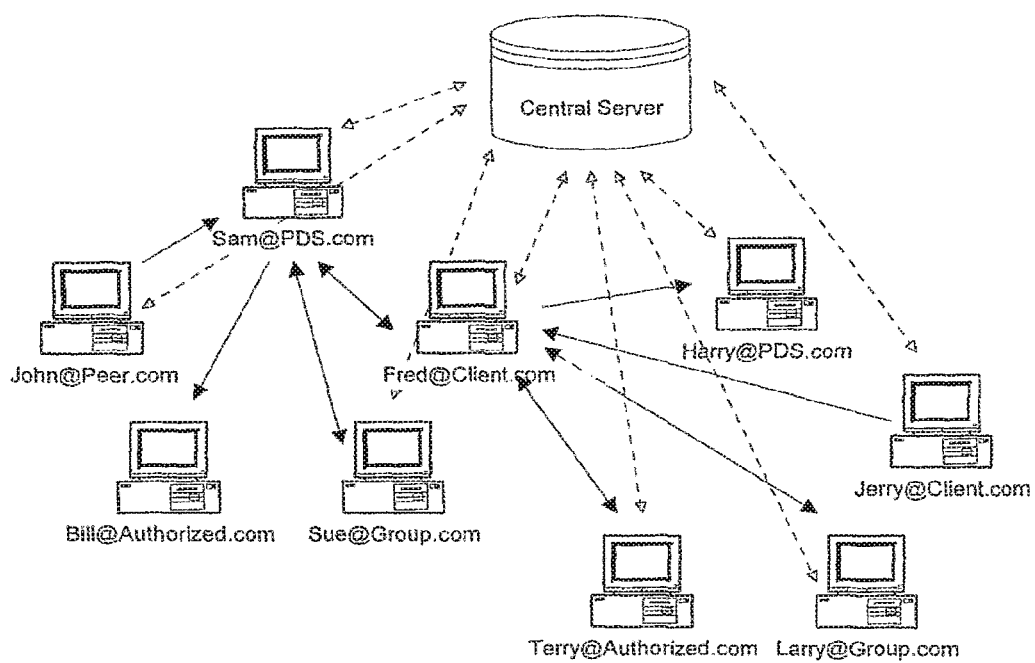
FIG. 7 is an illustration of the PDS system architecture.

Most computer network systems on the Global Computer Network rely on a central node or "super node" for the co-ordination, organization and management of their related users and the sharing of information and content. There currently does not exist a system for peer-to-peer access and the sharing of content among users, which does not rely on the continuous use of a central device. The PDS peer-to-peer network described herein only relies on the central server for initial setup, fail over, and addition and authorization of new users and devices. An exemplary peer-to-peer network is schematically illustrated in FIG. 7. The system's design provides for the direct secure communication among the networked devices without the involvement of a central server. Each PDS device contains the required information that allows it to directly communicate with and update all of the other PDS devices within its Peer Group. This self-reliance of individual nodes provides the system with:

Ability to directly and securely request and implement peer-to-peer content sharing and transfer A scalable system not limited by amount of content or number of devices in the network Ability to securely request information from Peers regarding another Peer without accessing a central server and without disclosing the Peer's password.

Ability to self-configure and maintain network connections without the involvement of a central server.

What is claimed:

1. A computer-implemented method of updating a list of files stored by a computer acting as a peer-to-peer server computer, the list of files identifying content of each directory of a list of directories wherein the files are located, and other directories, and of notifying other computers of the availability of additional content, the method comprising:

(a) for each directory listed in the list of directories on the peer-to-peer server computer where the files are located, the peer-to-peer server computer automatically scanning the listed directory to identify a file available for sharing with at least some of the peer-to-peer client computers, said available file not previously listed in the list of files for the listed directory, the list of files being stored on the peer-to-peer server computer;

(b) the peer-to-peer server computer automatically updating the list of files, for the listed directory, with indicia of the file identified in part (a); and (c) in response to part (b), the peer-to-peer server computer automatically notifying a plurality of the peer-to-peer client computers of the availability of additional content, including the file identified in part (a), as available for sharing with at least some of the peer-to-peer client computers that have access to the peer-to-peer server computer, wherein each of the plurality of the notified peer-to-peer client computers is associated with a user having authorization to access a subset of files stored on the peer-to-peer server computer, including the file identified in part (a), the available files being identified in the list of files for the listed directory.

2. The method of claim 1, wherein the directories are checked in an order starting with a directory with the highest likelihood of finding a file not listed in the list of files.

3. The method of claim 2, wherein part (c) of the method comprises communicating the updated list of files to said plurality of peer-to-peer client computers.

4. The method of claim 3, wherein each user's access to the subset of files is authorized by a global unique identifier associated with that user.

5. The method of claim 3, wherein the updated list of files communicated to each of the plurality of peer-to-peer client computers contains indicia of the subset of files to which the associated user has authorization to access.

6. The method of claim 3, wherein the peer-to-peer server computer performs part (a) of the method in response to a request by one of the plurality of peer-to-peer client computers for an updated list of files.

7. A computer acting as a peer-to-peer server computer, connected to a computerized file storage and programmed to update a list of stored files in the storage, the list of files identifying content of each directory of a list of directories wherein the files are located, and other directories, and to notify other computers of the availability of additional content, the peer-to-peer server computer programmed to perform a method comprising:
  (a) for each directory listed in the list of directories on the peer-to-peer server computer where the files are located, the peer-to-peer server computer automatically scanning the listed directory to identify a file available for sharing with at least some of the peer-to-peer client computers, said available file not previously listed in the list of files for the listed directory, the list of files being stored by the computerized file storage connected to the peer-to-peer server computer;
  (b) the peer-to-peer server computer automatically updating the list of files, for the listed directory, with indicia of the file identified in part (a); and
  (c) in response to part (b), the peer-to-peer server computer automatically notifying a plurality of the peer-to-peer client computers of the availability of additional content, including the file identified in part (a), as available for sharing with at least some of the peer-to-peer client computers that have access to the peer-to-peer server computer, wherein each of the plurality of the notified peer-to-peer client computers is associated with a user having authorization to access a subset of files stored on the peer-to-peer server computer, including the file identified in part (a), the available files being identified in the list of files for the listed directory.

8. The computer of claim 7, wherein the peer-to-peer server computer is programmed to check the directories in an order starting with a directory with the highest likelihood of finding a file not listed in the list of files.

9. The computer of claim 7, wherein the peer-to-peer server computer is programmed to perform part (c) of the method by communicating the updated list of files to said plurality of peer-to-peer client computers.

10. The computer of claim 9, wherein each user's access to the subset of files is authorized by a global unique identifier associated with that user.

11. The computer of claim 9, wherein the updated list of files communicated to each of the plurality of peer-to-peer client computers contains indicia of the subset of files to which the associated user has authorization to access.

12. The computer of claim 9, wherein the peer-to-peer server computer is programmed to perform part (a) of the method in response to a request by one of the plurality of peer-to-peer client computers for an updated list of files.

13. An article comprising a tangible medium that is not a transitory propagating signal encoding computer-readable instructions that, when applied to a computer acting as a peer-to-peer server computer, connected to a computerized file storage, instruct the peer-to-peer server computer to perform a method of updating a list of stored files in the storage, the list of files identifying content of each directory of a list of directories wherein the files are located, and other directories, and to notify other computers of the availability of additional content, the method comprising:
  (a) for each directory listed in the list of directories on the peer-to-peer server computer where the files are located, the peer-to-peer server computer automatically scanning the listed directory to identify a file available for sharing with at least some of the peer-to-peer client computers, said available file not previously listed in the list of files for the listed directory, the list of files being stored by the computerized file storage connected to the peer-to-peer server computer;
  (b) the peer-to-peer server computer automatically updating the list of files, for the listed directory, with indicia of the file identified in part (a); and
  (c) in response to part (b), the peer-to-peer server computer automatically notifying a plurality of the peer-to-peer client computers of the availability of additional content, including the file identified in part (a), as available for sharing with at least some of the peer-to-peer client computers that have access to the peer-to-peer server computer, wherein each of the plurality of the notified peer-to-peer client computers is associated with a user having authorization to access a subset of files stored on the peer-to-peer server computer, including the file identified in part (a), the available files being identified in the list of files for the listed directory.

14. The article of claim 13, wherein the instructions instruct the peer-to-peer server computer to check the directories in an order starting with a directory with the highest likelihood of finding a file not listed in the list of files.

15. The article of claim 13, wherein the instructions instruct the peer-to-peer server computer to perform part (c) of the method by communicating the updated list of files to said plurality of peer-to-peer client computers.

16. The article of claim 15, wherein each user's access to the subset of files is authorized by a global unique identifier associated with that user.

17. The article of claim 15, wherein the updated list of files communicated to each of the plurality of peer-to-peer client computers contains indicia of the subset of files to which the associated user has authorization to access.

18. The article of claim 15, wherein the instructions instruct the peer-to-peer server computer to perform part (a) of the method in response to a request by one of the plurality of peer-to-peer client computers for an updated list of files.

* * * * *

UNITED STATES PATENT AND TRADEMARK OFFICE
CERTIFICATE OF CORRECTION

PATENT NO. : 10,819,782 B2
APPLICATION NO. : 16/586132
DATED : October 27, 2020
INVENTOR(S) : James Hoffman et al.

Page 1 of 1

It is certified that error appears in the above-identified patent and that said Letters Patent is hereby corrected as shown below:

At Column 1, Line 15, delete "[Fish]"

Signed and Sealed this
Fifteenth Day of December, 2020

Andrei Iancu
*Director of the United States Patent and Trademark Office*